(12) United States Patent
Horiuchi et al.

(10) Patent No.: US 7,078,120 B2
(45) Date of Patent: *Jul. 18, 2006

(54) FUEL CELL

(75) Inventors: Michio Horiuchi, Nagano (JP);
Shigeaki Suganuma, Nagano (JP);
Misa Watanabe, Nagano (JP); Shuji Yamazaki, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 307 days.

This patent is subject to a terminal disclaimer.

(21) Appl. No.: 10/401,738

(22) Filed: Mar. 31, 2003

(65) Prior Publication Data

US 2003/0186104 A1    Oct. 2, 2003

(30) Foreign Application Priority Data

Apr. 2, 2002    (JP)    ............................ 2002-100036

(51) Int. Cl.
*H01M 8/02*    (2006.01)
(52) U.S. Cl. ........................ 429/26; 429/34; 429/38
(58) Field of Classification Search .................. 429/26, 429/34, 38
See application file for complete search history.

(56) References Cited

U.S. PATENT DOCUMENTS 4,248,941 A   2/1981   Louis et al. ................... 429/13
6,733,915 B1 * 5/2004  Barton et al. ................. 429/34
2003/0118883 A1 * 6/2003  Breault et al. ................ 429/26

FOREIGN PATENT DOCUMENTS

| EP | 0924786 | 6/1999 |
| EP | 0926755 | 6/1999 |
| EP | 1294036 | 3/2003 |
| JP | 61-203572 | * 9/1986 |
| WO | WO 01/73880 | 10/2001 |

OTHER PUBLICATIONS

Priestnall, et al., "Compact Mixed-Reactant Fuel Cells", Journal of Power Sources, vol. 106, No. 1-2, Apr. 1, 2002, pp. 21-30.

* cited by examiner

*Primary Examiner*—John S. Maples
(74) *Attorney, Agent, or Firm*—Staas & Halsey LLP

(57)    ABSTRACT

A fuel cell comprising a container and a fuel cell element or elements contained in the container, to which a mixed fuel gas containing a fuel gas and oxygen is fed to generate electricity, and the gas having passed through the fuel cell element or elements is discharged, as an exhaust gas, from the container, wherein the space other than the fuel cell element or elements in the container, through which the mixed fuel gas or the exhaust gas flows, is filled with packing materials to form a packed layer having a gap between the adjacent packing materials, at which gap the mixed fuel gas cannot be ignited, during the operation of the fuel cell, even if the mixed fuel gas has a fuel gas concentration within the ignition limits for the mixed fuel gas, and a burn-up section, in which the exhaust gas discharged from the packed layer is burned, is provided at, or in the vicinity of, the exhaust gas outlet of the container.

21 Claims, 5 Drawing Sheets

FUEL CELL

BACKGROUND OF THE INVENTION

1. Field of the Invention

The invention relates to a fuel cell and, more particularly, to a fuel cell in which a mixed fuel gas comprising a fuel gas, such as methane, and oxygen is fed to a fuel cell element or elements contained in a container to generate electricity, and the gas having passed through the fuel cell element or elements is discharged, as an exhaust gas, from the container.

2. Description of the Related Art

A fuel cell can be expected to have high efficiency, in power generation, compared to power generation in a thermal power plant or others, and is currently being studied by many researchers.

As shown in FIG. 4, such a conventional fuel cell is provided with an element 106 for the fuel cell, which element uses, as a solid electrolyte layer 100 of an oxygen ion conduction type, a fired body made of stabilized zirconia to which yttria ($Y_2O_3$) is added, the solid electrolyte layer 100 having one side on which a cathode layer 102 is formed, and another side on which an anode layer 104 is formed. Oxygen or an oxygen-containing gas is fed to the side of the cathode layer 102 of the fuel cell element 106, and a fuel gas, such as methane, is fed to the side of the anode layer 104.

The oxygen ($O_2$) fed to the side of the cathode layer 102 of the fuel cell element 106 as shown in FIG. 4 is ionized into oxygen ions ($O^{2-}$) at the boundary between the cathode layer 102 and the solid electrolyte layer 100, and the oxygen ions ($O^{2-}$) are conducted to the anode layer 104 by the electrolyte layer 100. The oxygen ions ($O^{2-}$) conducted to the anode layer 104 react with the methane ($CH_4$) gas fed to the side of the anode layer 104, to thereby form water ($H_2O$), carbon dioxide ($CO_2$), hydrogen ($H_2$), and carbon monoxide ($CO$). During the reaction, the oxygen ions release electrons, resulting in a potential difference between the cathode layer 102 and the anode layer 104. Accordingly, by establishing an electrical connection between the cathode layer 102 and the anode layer 104 by a lead wire 108, the electrons of the anode layer 104 pass in the direction toward the cathode layer 102 (the direction of the arrow in the drawing) through the lead wire 108, and electricity is produced by the fuel cell.

The fuel cell shown in FIG. 4 is operated at a temperature of about 1000° C. At such a high temperature, the side of cathode layer 102 of the fuel cell element 106 is exposed to an oxidizing atmosphere, and the side of anode layer 104 is exposed to a reducing atmosphere. Consequently, it has been difficult to enhance the durability of the fuel cell element 106.

It is reported, in Science, vol. 288, pp2031–2033 (2000), that, as shown in FIG. 5, even when a fuel cell element 206 made up of a solid electrolyte layer 200, and a cathode layer 202 and an anode layer 204 respectively formed on one side and another side of the electrolyte layer 200, is placed in a mixed fuel gas of methane and oxygen, the fuel cell element 206 develops an electromotive force.

By placing the element 206 in a mixed fuel gas, as in the fuel cell illustrated in FIG. 5, the element 206 can be enveloped as a whole in substantially the same atmosphere, and can have improved durability compared to the element 106 shown in FIG. 4 in which the respective sides of the element 106 are exposed to atmospheres different from each other.

Nevertheless, as a mixed fuel gas of methane and oxygen is fed to the fuel cell shown in FIG. 5, at a high temperature of about 1000° C., the mixed fuel gas is adjusted to contain oxygen at a concentration smaller than the ignition limit (lower ignition limit) concentration of oxygen for the mixture of methane and oxygen (a concentration of methane exceeding the ignition limit (upper ignition limit) concentration of methane for the mixture of methane and oxygen) prior to being fed to the fuel cell, in order to avoid the danger of an explosion.

For this reason, in the condition of an extremely small amount of oxygen, the fuel cell element 206 has a small power generation efficiency, and the fuel component, such as methane, may be carbonized to thereby further reduce the performance of the fuel cell.

SUMMARY OF THE INVENTION

It is an object of the invention to provide a fuel cell which can use a mixed fuel gas of a fuel, such as methane, and oxygen, the mixed fuel gas having an increased concentration of oxygen, so as to enable the power generation efficiency of a fuel cell element used to be improved, while preventing an explosion of the mixed fuel gas.

To this end, the inventors considered that the explosion-proof structure of the space other than a fuel cell element or elements in a container of a fuel cell and the safety treatment of the exhaust gas discharged from the container in which the fuel cell element or elements are accommodated is significant, and consequently found that the explosion of a mixed fuel gas can be prevented by filling the space with packing materials to form a packed layer having a gap between the adjacent packing materials, in which gap the mixed fuel gas cannot be ignited even if the mixed fuel gas has a fuel gas concentration within the ignition limits, and that the exhaust gas of a mixture of the oxygen and the fuel gas can be safely treated by providing a burn-up section in which the exhaust gas discharged from the packed layer is burned.

Thus, the invention resides in a fuel cell comprising a container and a fuel cell element or elements contained in the container, to which a mixed fuel gas containing a fuel gas, such as methane, and oxygen is fed to generate electricity, and the gas having passed through the fuel cell element or elements is discharged, as an exhaust gas, from the container, wherein the space other than the fuel cell element or elements in the container, through which the mixed fuel gas or the exhaust gas flows, is filled with packing materials to form a packed layer having a gap between the adjacent packing materials, in which gap the mixed fuel gas cannot be ignited, during the operation of the fuel cell, even if the mixed fuel gas has a fuel gas concentration within the ignition limits for the mixed fuel gas, and a burn-up section, in which the exhaust gas discharged from the packed layer is burned, is provided at, or in the vicinity of, the exhaust gas outlet of the container.

In the invention, the ignition of the mixed fuel gas in the packed layer can be reliably prevented by making the gap between the adjacent packing materials smaller than the quenching distance for the mixed fuel gas.

Also, the detonation can be prevented even if the mixed fuel gas is ignited in the packed layer by making the maximum gap between the adjacent packing materials equal to or smaller than the quenching diameter for the mixed fuel gas.

The explosion-protection function in the space of the container can be further enhanced by providing a heating means at the section of the container having the fuel cell element accommodated and a cooling means at the section of the container in which the packing materials are filled.

By the use of a section for burning the exhaust gas on the heating means for heating the section having the fuel cell element accommodated, the heat generate by the combustion of the exhaust gas can be effectively used.

As the packing material, powder or granular material, porous material, or tubules made of a metal or ceramic which is stable at the operating conditions of the fuel cell, can be preferably used.

A multi-element stack formed by stacking a plurality of single fuel cell elements having a solid electrolyte layer sandwiched between a cathode layer and an anode layer in such a manner that the anode layer of one fuel cell element and the cathode layer of another fuel cell element, which are adjacent to each other, are directly joined to each other, can be used to produce a desired voltage from a fuel cell.

In the case where such a multi-element stack is placed in a container of a fuel cell so that the anode and cathode layers of the multi-element stack are parallel to the direction of the flow of a mixed fuel gas, the respective cathode and anode layers can be porous layers having a multitude of pores through which a mixed fuel gas can pass, and the solid electrolyte layers can have a dense structure through which the mixed fuel gas does not pass, in effect.

On the other hand, in the case where a multi-element stack is placed in a container of a fuel cell so that the anode and cathode layers of the multi-element stack are perpendicular to the direction of the flow of a mixed fuel gas, the mixed fuel gas can pass through the multi-element stack by using, as the respective anode, cathode and solid electrolyte layers, porous layers having a multitude of pores through which the mixed fuel gas can pass, and there is no need to provide another passage or path for the fuel gas.

According to the invention, an explosion at the space other than the fuel cell element in the container of a fuel cell can be prevented, and the exhaust gas can be safely treated by burning the exhaust gas in a burn-up section, so that the concentration of oxygen in a mixed fuel gas can be increased (a reduction of the concentration of a fuel component). As a result, the efficiency in power generation of a fuel cell element can be enhanced, and the deterioration of the cell performance due to the carbonization of the fuel component in a mixed fuel gas can be prevented.

BRIEF DESCRIPTION OF THE DRAWINGS

The above and other objects and advantages of the invention will be understood and appreciated by a person with ordinary skill in the art, from consideration of the following detailed description made by referring to the attached drawings, wherein.

DETAILED DESCRIPTION OF THE INVENTION

Figure 1:
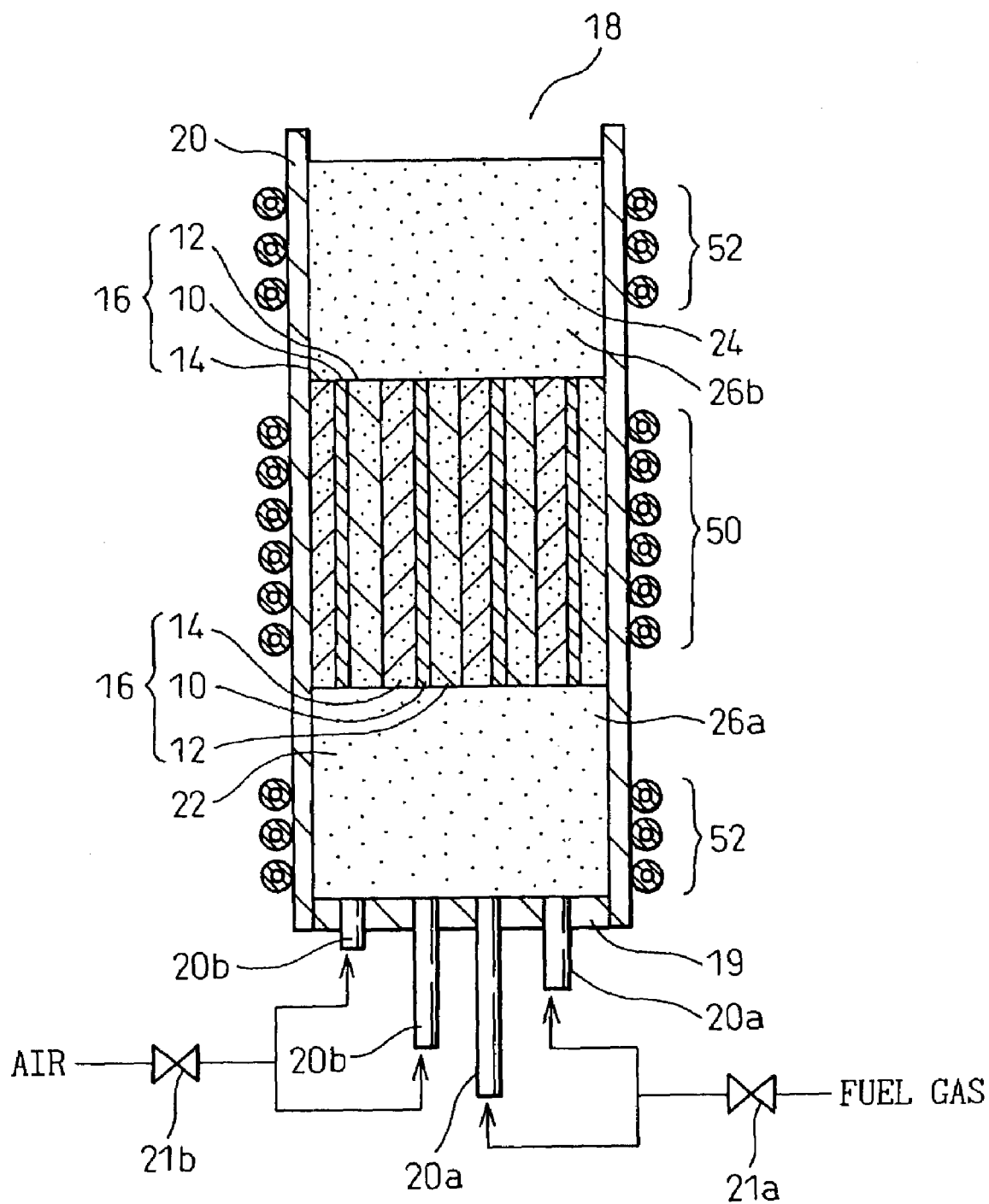
FIG. 1 is a schematic sectional view illustrating an embodiment of the fuel cell according to the invention.

FIG. 1 schematically shows an embodiment of the fuel cell according to the invention. The fuel cell shown in the drawing comprises a cylindrical container 20 having a rectangular, circular or the like cross-section and a stack of a plurality of unit fuel cell elements 16 contained in the container 20.

The container 20 is opened at one end, and has a cover 19 at the other end which is provided with fuel supplying piping 20$a$, through which a fuel gas, such as methane, is fed to the container 20, and air supplying piping 20$b$ for feeding air to the container 20. Each of the fuel supplying piping and the air supplying piping has, on the way to the container 20, a valve 21$a$, 21$b$ for adjusting the amount of the fuel gas or air fed to the container 20. The fuel gas and the air respectively fed to the container 20 via the fuel supplying piping 20$a$ and the air supplying piping 20$b$ are mixed in the container 20, to form a mixed fuel gas (which may be called a mixed gas hereinafter). The fuel gas and the air may be mixed before being fed to the container, and the resultant mixed fuel gas may be fed to the container.

The container 20 is formed of a thermally resistant material, such as a ceramic, capable of withstanding a temperature of up to about 1200° C., so as to show sufficient thermal resistance at an operating temperature of the fuel cell.

Each of the unit fuel cell elements 16 forming the stack of fuel cell elements comprises a solid electrolyte layer 10 having a dense structure, and a porous cathode layer 12 and a porous anode layer 14 formed on the respective sides of the solid electrolyte layer 10. The anode layer 14 of the element 16 is directly joined to the cathode layer 12 of the adjacent element 16, to form the stack of a plurality of fuel cell elements. Electricity generated by the stack of elements 16 in the fuel cell is taken out using leads (not shown) connected to the respective outermost layers (i.e., the cathode layer 12 at the right end and the anode layer 14 at the left end in the drawing) of the stack.

The solid electrolyte layer 10 used to fabricate each of the unit fuel cell elements 16 shown in FIG. 1 is an oxygen ion conductor, and is formed of a zirconium oxide partially stabilized by an element of group III of the periodic table, such as yttrium (Y) or scandium (Sc), or a cerium oxide which is doped with a lanthanide, such as samarium (Sm) or gadolinium (Gd).

The cathode layers 12 are formed of manganite, gallate or cobaltite compounds of lanthanum to which an element of group III of the periodic table, such as strontium (Sr), is added. The anode layers 14 are formed of a body supporting nickel cermet or platinum to which 10 to 30% by weight of a solid electrolyte forming the solid electrolyte layer 10 is added. The cathode layers 12 and anode layers 14 formed of such materials are porous, and are preferred to have an open porosity equal to or greater than 20%, more preferably 30 to 70%, and particularly 40 to 50%.

The stack of fuel cell elements 16 shown in FIG. 1 can be fabricated by placing green sheets for the cathode layer and the anode layer on the respective sides of a pre-fired and shaped solid electrolyte layer 10, or applying pastes for the cathode layer and the anode layer to the respective sides of a pre-fired solid electrolyte layer, and firing a necessary number of assemblies of the green sheets or pastes and the pre-fired solid electrolyte layer together. Alternatively, the stack of fuel cell elements 16 may be obtained by stacking a necessary number of fired assemblies to thereby integrate them.

The cathode layers 12 and anode layers 14 used in the fuel cell shown in FIG. 1 are porous and, consequently, a mixed gas containing a fuel gas and air respectively fed from the fuel supplying lines 20$a$ and the air supplying lines 20$b$ can pass through them. To take advantage of this, the stack of fuel cell elements 16 of the fuel cell shown in FIG. 1 is accommodated in the container 20 so that the cathode layers 12 and the anode layers 14 forming the respective single fuel cell elements 16 are arranged parallel to the direction of flow of the mixed fuel gas. In order for the mixed gas in the container 20 to securely pass through the cathode layers 12 and the anode layers 14, all or at least part of the outer faces of the stack of fuel cell elements 16 is brought into intimate contact with the inner faces of the container 20, and the mixed gas fed into the container 20 is prevented from bypassing the stack through the gaps between the container inner faces and the stack outer faces. A material having a low porosity, such as alumina cement or high melting-point glass, may be used to seal the gap between the container inner faces and the stack outer faces, as required.

The container 20 has spaces 22 and 24 between the cover 19 and the stack of fuel cell elements 16 and between the stack of elements 16 and the open end of the container 20, respectively. If these spaces 22, 24 are empty, it is required that the oxygen concentration in a mixed fuel gas is less than the ignition limit (lower ignition limit) concentration of oxygen for the mixed gas (a concentration of fuel gas, such as methane, is higher than the ignition limit (upper ignition limit) concentration of the fuel gas for the mixed gas), in order to prevent the mixed fuel gas from being ignited at a high temperature, about 1000° C., at which the fuel cell is operated.

When a mixed gas having such a low concentration of oxygen is used, a fuel cell element has a low efficiency in power generation, and may be subjected to the reduction of the fuel cell performance as the carbonization of a fuel, such as methane, proceeds.

On the other hand, if the mixed gas has an oxygen concentration at which the fuel gas will be not carbonized, and the efficiency in power generation of the fuel cell element can be enhanced, the composition of the mixed gas in the space 22 is within the ignition limit to thereby remarkably increase the danger of explosion.

In the fuel cell shown in FIG. 1, packing materials 26 are filled in the spaces 22, 24 to form packed layers 26a, 26b, in such a manner that there is a gap between the adjacent packing materials, at which gap the mixed fuel gas cannot be ignited at the operating condition of the fuel cell even if the mixed fuel gas having an oxygen concentration (or fuel gas concentration) within the ignition limits is present in the packed layers 26a, 26b.

Specifically, the packing materials 26 are filled so that the gap between the adjacent packing materials is smaller than the quenching distance for the mixed gas in the packed layers 26a, 26b having a concentration within the ignition limits. Thus, even if the mixed fuel gas fed to the container 20 has an increased oxygen concentration at which the mixed fuel gas is ignited, the ignition in the packed layers 26a, 26b can be avoided.

The "quenching distance" for a mixed gas as used herein is defined in B. Lewis et al., Combustion, Flames and Explosions of Gases, 3rd edition, Academic Press, Inc., p. 246 (1987), and means a distance within which two flat walls must be brought to prevent flashback of a mixed gas. At a distance smaller than that distance, no ignition occurs however large an energy is given to a mixed gas. The quenching distance varies depending on the oxygen concentration, the pressure and the like of a mixed gas and, accordingly, it is preferred that the quenching distance for the mixed gas in the packed layers 26a, 26b is experimentally determined in advance at the operating conditions of the fuel cell.

The gaps between the packing materials in the packed layers 26a, 26b are not uniform, and have a distribution. For this reason, there can be a case where although the gaps between the packing materials are, on average, smaller than the quenching distance of a mixed gas in the packed layers 26a, 26b, during the operation of a fuel cell, some of the gaps are larger than the quenching distance. In this case, the ignition of the mixed gas can lead to detonation, and the detonation can be prevented even if the mixed gas is ignited, by limiting the maximum gap between the packing materials to a distance equal to or smaller than the quenching diameter for the mixed fuel gas, at which the detonation of the mixed gas in the packed layers 26a, 26b can be inhibited during the operation of a fuel cell. The "quenching diameter" as used herein means a critical diameter of a tube below which combustion wave generated by the ignition of a mixed gas blown out of the tube cannot intrude (flash back) into the tube, and described in, e.g., B. Lewis et al., Combustion, Flames and Explosions of Gases, 3rd edition, Academic Press, Inc., p. 240 (1987). For example, the quenching diameter of a mixed gas of methane and oxygen is 0.1 to 3 millimeters.

As the packing material 26 to be filled in the spaces 22, 24 of the fuel cell shown in FIG. 1, a powder or granular material, porous material, or tubules made of a metal or ceramic which are stable at the operating conditions of the fuel cell, can be used.

Preferably, such a powder or granular material, porous material, or tubules can be formed of a metal selected from the group consisting of Ti, Cr, Te, Co, Ni, Cu, Al, Mo, Rh, Pd, Ag, W, Pt and Au or an alloy comprising one or more of them, or can be formed of a ceramic comprising one or more selected from the group consisting of Mg, Al, Si and Zr.

It is preferred that the powder or granular material has a diameter of 50 to 1,000 micrometers, and the porous material has an open porosity of 50% or larger. As the tubules, a tubular material having an inner diameter of 100 to 200 micrometers can be preferably used. Long tubules may be filled in the spaces 22, 24 to be arranged in the direction of the flow of the mixed gas, or short tubules may be filled in the spaces 22, 24 at random.

In the fuel cell shown in FIG. 1, the gap between the adjacent packing materials in the packed layer 26b formed in the space 24 at the side of outlet of the stack of the fuel cell elements 16 is at a distance at which the ignition in the packed layers 26a, 26b can be avoided even if there is a mixed gas having an oxygen concentration (or fuel gas concentration) within the ignition limits at the operation of the fuel cell. On this account, a burn-up section 18 can be provided at the outlet of exhaust gas from the packed layer 26b, i.e., at the open end of the container 20, at which burn-up section the exhaust gas is burned, preventing the mixed gas in the packed layer 26b from catching fire from the burn-up section 18.

By providing the burn-up section 18 for burning of the exhaust gas at the outlet of exhaust gas from the packed layer 26b, or in close proximity to the outlet, the exhaust gas can be safely treated compared to the case where the exhaust gas is discharged out of the fuel cell using piping, to which it is difficult to provide an explosion-proof structure.

The fuel cell shown in FIG. 1 is also provided with a heater 50, as a heating means for heating the section in which the stack of fuel cell elements 16 is located, and coolers 52, as cooling means for cooling the packed layers

26a, 26b. The cooler 52 may be made of tubing through which a cooling medium, such as cooling water, passes. By cooling the mixed fuel gas present in the packed layers 26a, 26b, the mixed fuel gas can have a large quenching diameter. In the case where the packed layers 26a, 26b are forcedly cooled, it is preferred that the packing material forming the packed layers 26a, 26b is made of a metal having good thermal conductivity.

Preferably, each of a fuel gas and air is fed to the container 20 at a plurality of inlets. By dividedly feeding the fuel gas and air, respectively, uneven flows of the fuel gas and air in the container 20 can be prevented. The flow rates of the fuel gas and air fed to the container 20 may be adjusted by regulation valves 21a, 21b, respectively.

The mixed gas fed to the packed layer 26a at the side of inlet of the stack of the fuel cell elements 16 passes through the gaps between the packing materials 26 filled therein to reach the stack of fuel cell elements 16, and flows through the porous cathode layers 12 and anode layers 14 toward the packed layer 26b. During this time, the mixed gas diffuses into the pores of the cathode layers 12 and anode layers 14, and reaches the surface of the solid electrolyte layers 10. A combustible gas component, such as methane, of the mixed gas which has reached the surface of the solid electrolyte layer 10 electrochemically reacts with oxygen ions which have passed through the solid electrolyte layer 10, to form water ($H_2O$), carbon dioxide ($CO_2$), hydrogen ($H_2$), and carbon monoxide (CO), while electrons are released from the oxygen ions. The water, carbon dioxide, hydrogen, and carbon monoxide thus formed are discharged outward through the packed layer 26b.

Although as the mixed gas travels through the cathode layers 12 and anode layers 14 toward the packed layer 26b, it is decreased in the amount of oxygen, and is increased in the amounts of water, carbon dioxide, hydrogen, and carbon monoxide, as referred to above, the unreacted fuel gas being contained in the exhaust gas depending on the total effective area and efficiency of the stack of fuel cell elements. For this reason, the fuel component in the exhaust gas discharged from the packed layer 26b has a concentration within the combustible range (ignition limit), and is adequately combustible. Accordingly, when the exhaust gas is ignited at the burn-up section provided at the outlet from the packed layer 26b, or in close proximity thereto, it is burned and safely treated.

Also, even when the exhaust gas is burned at the burn-up section 18 provided at the exhaust gas outlet from the packed layer 26b, ignition does not penetrate into the packed layer 26b because the gap between the packing materials in the packed layer 26b is at a distance at which the ignition cannot occur even if there is a mixed gas having an oxygen concentration (or fuel gas concentration) within the ignition limits.

The burn-up section 18 may be provided with a heat recovery means, such as a heated coil, to recover the heat generated by the combustion of the exhaust gas in the burn-up section 18.

As the mixed gas fed to the fuel cell shown in FIG. 1, a mixed gas of a combustible gas, such as hydrogen, methane, ethane, propane, or butane, or a mixture thereof, and air can be preferably used.

Figure 2:
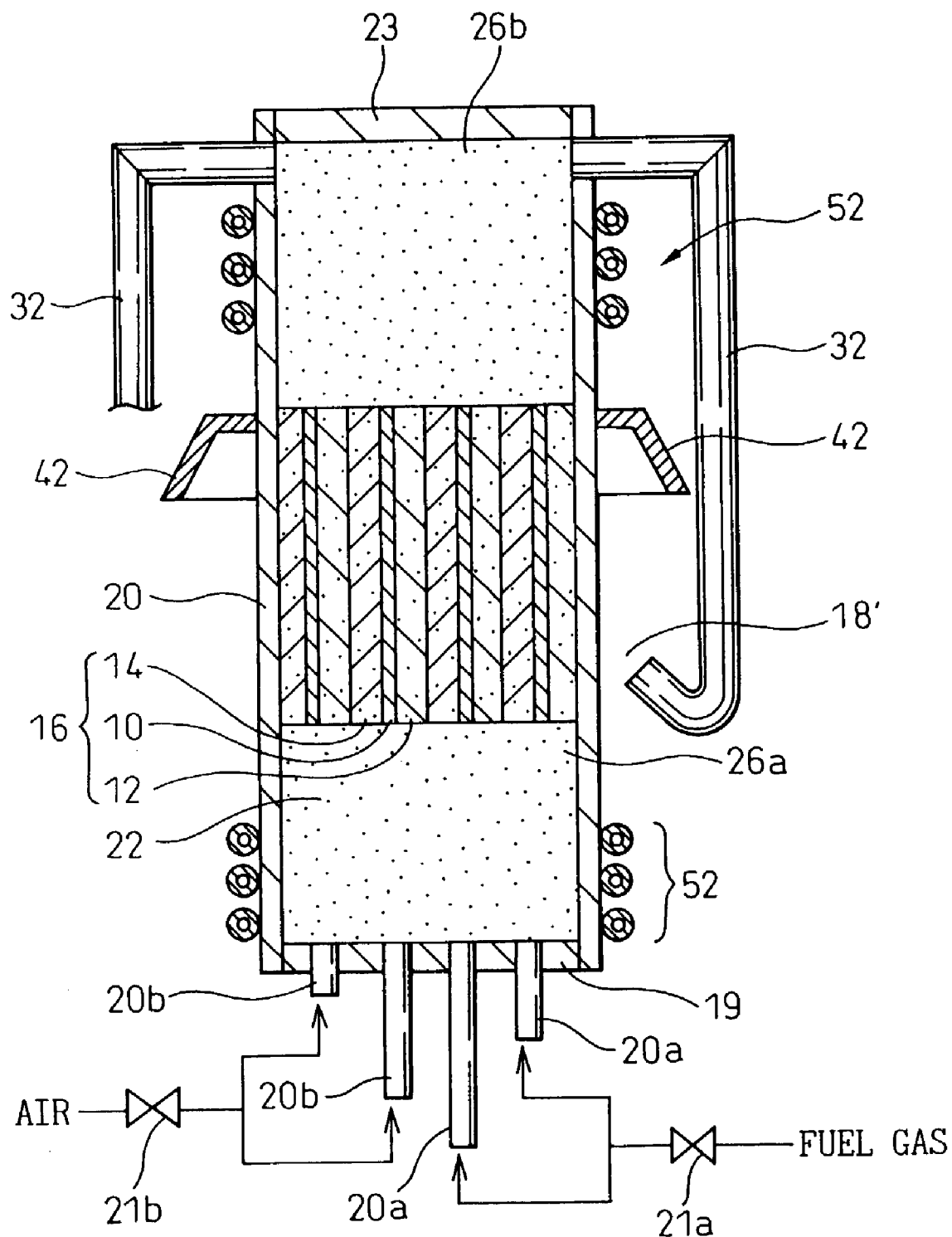
FIG. 2 is a schematic sectional view of another embodiment of the fuel cell according to the invention.

In the fuel cell shown in FIG. 1, it is possible to partly recover the heat generated by the combustion of the exhaust gas by the heat recovery means (not shown), such as a heated coil, provided at the burn-up section 18. On the other hand, using, as a heating means, a burn-up section 18' adapted to heat, by the combustion of the fuel gas in the exhaust gas, the section of the container 20 in which the stack of fuel cell elements 16 is accommodated, as shown in FIG. 2, makes it possible to easily heat the vicinity of the stack of fuel cell elements 16 to the operating temperature of the fuel cell. (In FIG. 2, the members constructing the fuel cell, which are the same as those in the fuel cell shown in FIG. 1, are represented by the same reference numerals as those in FIG. 1, and are not further described in detail.)

To the burn-up section 18' heating the section of the container 20 in which the stack of fuel cell elements 16 is contained, the exhaust gas discharged from the packed layer 26b is dividedly directed through a plurality of tubes 32. The tubes 32 are extended from the container 20 at a cover 23 or the vicinity thereof, the cover being provided at the outlet of the exhaust gas from the packed layer 26b, to the vicinity of the section of the container 20 in which the stack of fuel cell elements 16 is contained. In the fuel cell shown in FIG. 2, the end of each of the tubes 32 is located in the vicinity of the inlet of mixed gas to the stack of fuel cell elements 16, so that the burn-up section 18' is positioned closer to the inlet of the mixed gas to the stack.

The tubes 32 may be at least partially filled with a packing material so as to securely inhibit the ignition of the exhaust gas in the tubes 32.

In the fuel cell shown in FIG. 2, it is required, at the initiation of operation thereof, to heat the fuel cell elements up to an operating temperature thereof. To this end, the fuel gas and air are fed to the container 20 in a ratio of the fuel gas to the air allowing good combustion of the fuel gas by adjusting the valves 21a, 21b. At the initiation of operation of the fuel cell, the fuel cell elements 16 are at a temperature lower than the operating temperature thereof, so that the mixed fuel gas is hardly consumed in the fuel cell elements 16, is directed to the tubes 32, and reaches the burn-up section 18 in the vicinity of the outside of the section of the container 20, in which the fuel cell elements are contained, to be burned. When the fuel cell elements 16 is heated up to their operating temperature by the combustion of the mixed fuel gas at the burn-up section 18, the mixed fuel gas is consumed to generate electricity and heat. The valves 21a, 21b are then adjusted, accordingly, to regulate the mixing ratio of the fuel gas and the air to provide good efficiency in power generation.

As such, in the fuel cell shown in FIG. 2, a heater for heating the fuel cell elements 16, like the heater 50 as shown in FIG. 1, can be omitted.

In the fuel cells shown in FIGS. 1 and 2, as the solid electrolyte layer 10 constituting the fuel cell element 16 has a dense structure, the stack of fuel cell elements 16 is contained in the container 20 so that the cathode layers 12 and the anode layers 14 also constituting the respective fuel cell elements 16 are parallel to the direction of flow of the mixed gas, to thereby render the cathode layers 12 and the anode layers 14, which are porous layers, passageways for the mixed gas. The fuel cell of this type has a tendency to be difficult to seal between the circumferential faces of the stack of fuel cell elements 16 and the inner surfaces of the container 20.

Figure 3:
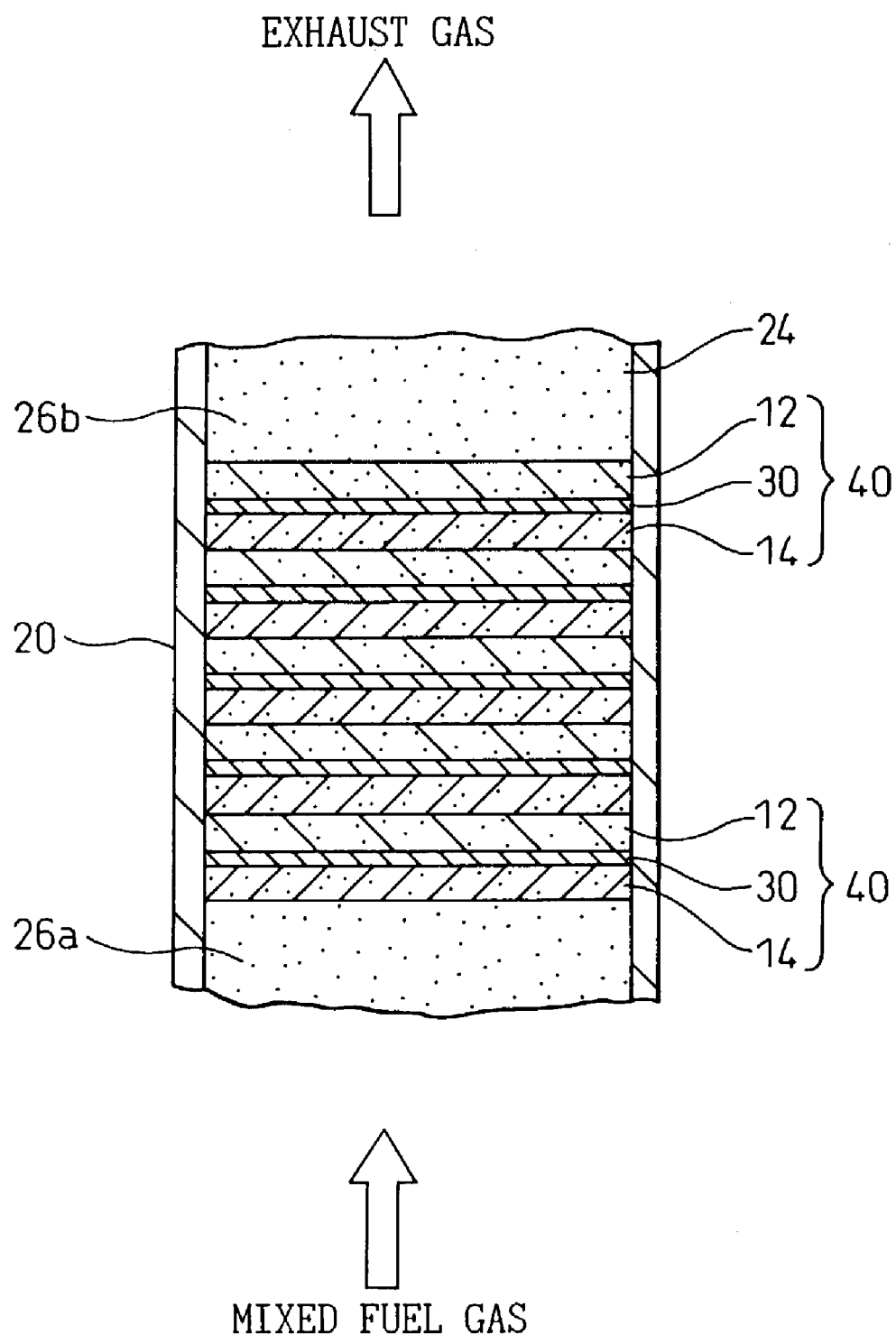
FIG. 3 is a schematic sectional view of a further embodiment of the fuel cell according to the invention.
Figure 4:
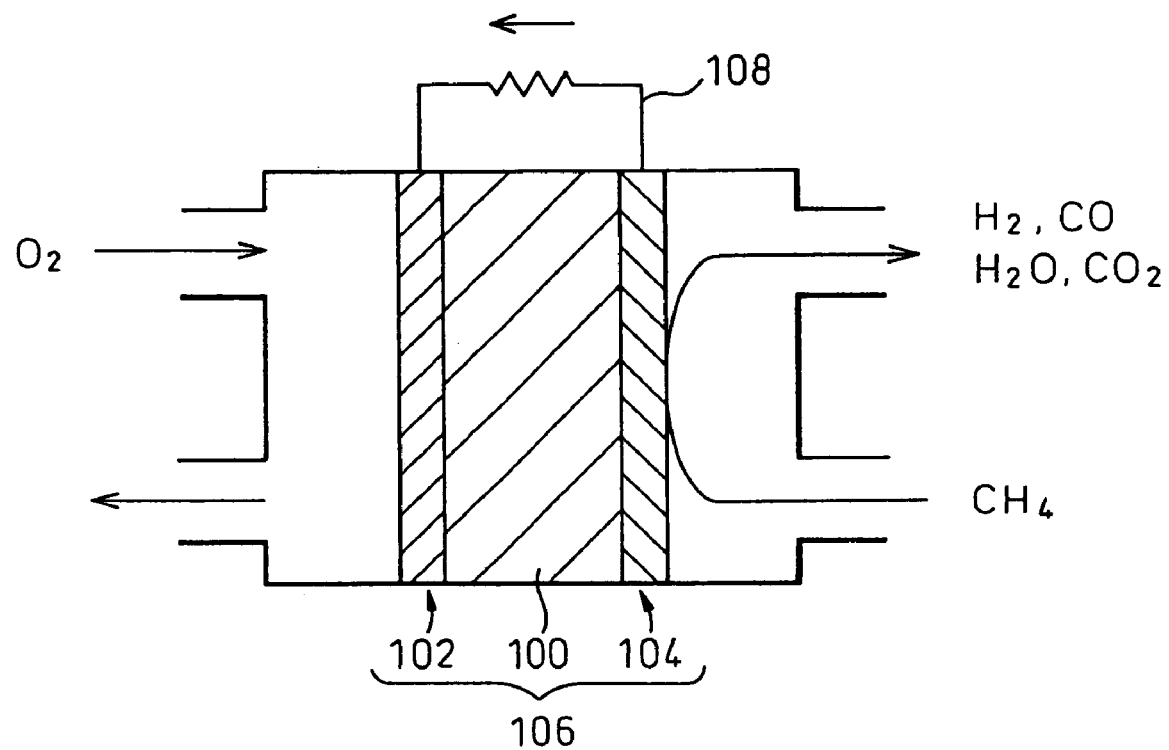
FIG. 4 illustrates a fuel cell of the prior art.
Figure 5:
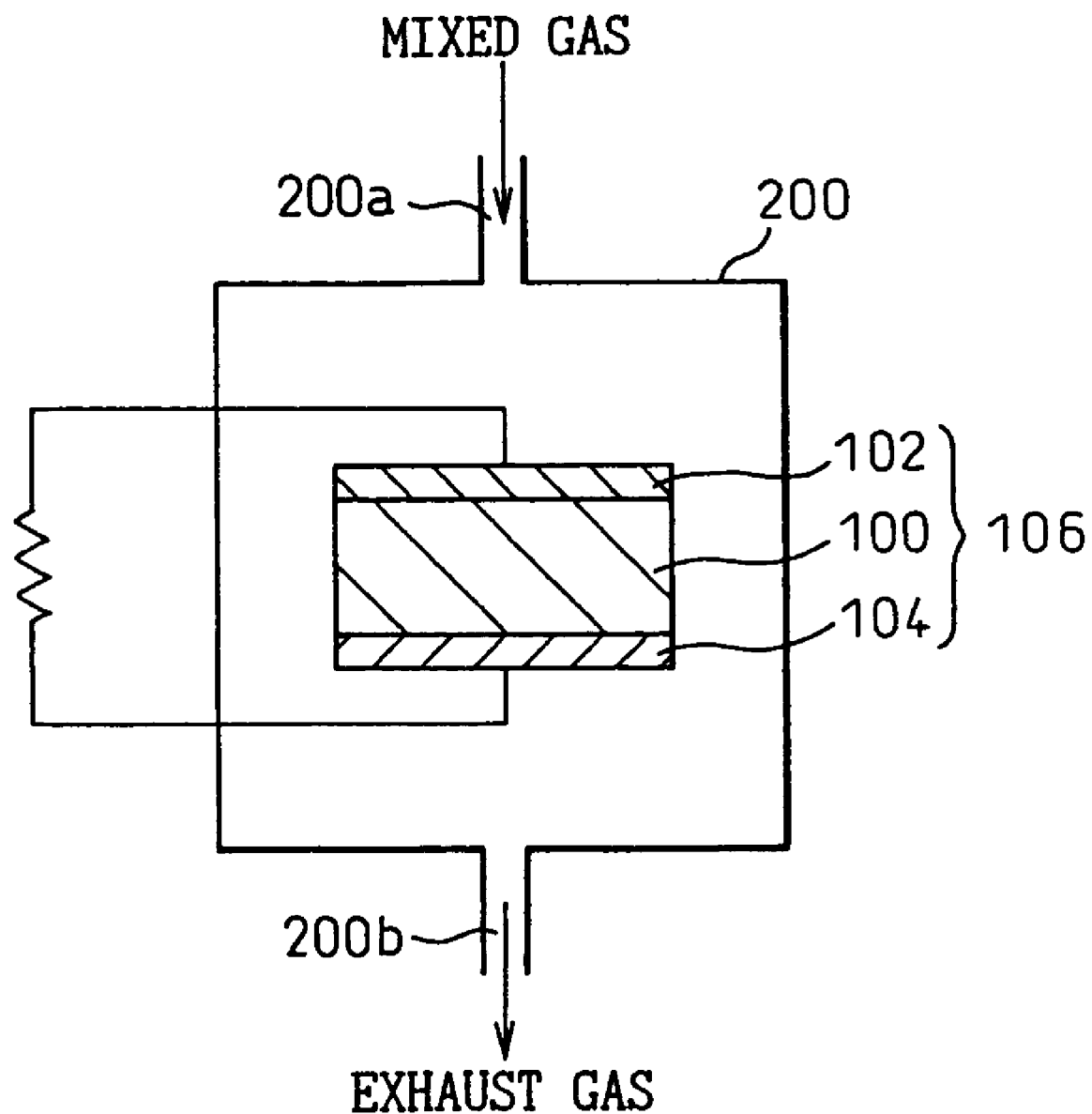
FIG. 5 illustrates a modified type of fuel cell recently reported.

By contrast, as shown in FIG. 3, the fuel cell can be easily sealed between the circumferential faces of the stack of fuel cell elements 40 and the inner surfaces of the container 20 by containing the stack of fuel cell elements 40, each of which is formed of a cathode layer 12, a solid electrolyte layer 30, and an anode layer 14, in the container so that the cathode layers 12 and the anode layers 14 constituting the fuel cell elements 40 are perpendicular to the direction of flow of the mixed gas fed to the container 20. In the fuel cell of this type, as the mixed gas must pass through the stack of fuel cell elements 40, traversing the respective anode layers 14, solid electrolyte layers 30, and cathode layers 12, as illustrated in FIG. 3, each of the cathode layers 12, anode layers 14, and solid electrolyte layers 30 of the stack of fuel cell elements 40 being formed of a porous material. In the fuel cell of this type, the porous layers are preferred to have an open porosity equal to or greater than 20%, more preferably 30 to 70%, and particularly 40 to 50%. In the fuel cell shown in this drawing, members other than the stack of fuel cell elements 40 are the same as those earlier described referring to FIG. 1, and are not further described herein.

The stack of fuel cell elements 40 shown in FIG. 3 can be obtained by firing the stack of green sheets, for the respective layers, formed to have a certain shape. On this account, the stack of fuel cell elements 40 shown in FIG. 3 can be made at a lower cost compared to the stacks of fuel cell elements 16 shown in FIGS. 1 and 2, which are made by placing green sheets for the cathode layer and the anode layer, formed to have a certain shape, on the respective sides of a pre-fired solid electrolyte layer 10, or applying pastes for the cathode layer and the anode layer to the respective sides of a pre-fired solid electrolyte layer, and then firing the assembly of the green sheets or pastes and the pre-fired solid electrolyte layer together.

In the fuel cell shown in FIG. 3, the mixed gas of a fuel gas and air causes electrochemical reactions while passing through the porous cathode, anode and electrolyte layers 12, 14, 30, and then passes over and is discharged from the packed layer 26b.

In the fuel cell illustrated in FIGS. 1 to 3 referred to above, the container 20 may be provided, in the section in which a stack of fuel cell elements is to be contained, with a temperature measuring means to thereby control the temperature of the section in question in such a manner that the temperature is optimum for the fuel cell elements. The temperature control of the section in which a stack of fuel cell elements is to be contained can be done using the heater 50 for the fuel cell depicted in FIG. 1, or controlling the degree of combustion in the burn-up section 18' for the fuel cell depicted in FIG. 2.

In some cases, the container 20 may be provided with heat insulators at the sections other than the section containing the stack of fuel cell elements (the zone heated by the heater 50 (FIG. 1) or the combustion at the burn-up section 18' (FIG. 2)). Further, the fuel cell illustrated in FIG. 2 may have a heat shield 42 so as to prevent the packed layer 26b, which may be cooled, from being heated by the heat generated by the combustion of the exhaust gas at the burn-up section 18'.

Although the fuel cells illustrated in FIGS. 1 to 3 use a plurality of stacked fuel cell elements, the invention may be also applied to a fuel cell using a single fuel cell element contained in a container provided that a mixed gas can be prevented from passing through the gaps between the fuel cell element and the container to bypass the fuel cell element.

As described, according to the invention, electricity can be safely generated in a fuel cell using a mixed fuel gas having an oxygen concentration falling within the ignition limits for the mixed fuel gas. Thus, the invention makes it possible to generate electricity using a mixed gas having an oxygen concentration adjusted to a concentration at which the efficiency in power generation is good, and can improve the efficiency in power generation of a fuel cell using a mixed gas, over that of prior fuel cells.

The invention claimed is:

1. A fuel cell comprising a container and a fuel cell element or elements contained in the container, to which a mixed fuel gas containing a fuel gas and oxygen is fed to generate electricity, and the gas having passed through the fuel cell element or elements is discharged, as an exhaust gas, from the container, wherein the space other than the fuel cell element or elements in the container, through which the mixed fuel gas or the exhaust gas flows, is filled with packing materials to form a packed layer having a gap between the adjacent packing materials, at which gap the mixed fuel gas cannot be ignited, at the operation of the fuel cell, even if the mixed fuel gas has a fuel gas concentration within the ignition limits for the mixed fuel gas, and a burn-up section, in which the exhaust gas discharged from the packed layer is burned, is provided at or in the vicinity of the exhaust gas outlet of the container.

2. The fuel cell of claim 1, wherein the gap between the adjacent packing materials in the packed layer is smaller than the quenching distance for the mixed fuel gas.

3. The fuel cell of claim 1, wherein the maximum gap between the adjacent packing materials in the packed layer is equal to or smaller than the quenching diameter for the mixed fuel gas.

4. The fuel cell of claim 1, wherein a section of the container, in which the fuel cell element is located, is provided with a heating means and a section of the container, in which the packed layer is provided, is provided with a cooling means.

5. The fuel cell of claim 4, wherein the burn-up section is used as the heating means.

6. The fuel cell of claim 1, wherein powder or granular material, porous material, or tubules made of a metal or ceramic, which is stable at the operating conditions of the fuel cell, is used as the packing material.

7. The fuel cell of claim 1, wherein the packing material is a powder or granular material having a diameter of 50 to 1,000 micrometers.

8. The fuel cell of claim 1, wherein the packing material is a porous material having an open porosity of 50% or larger.

9. The fuel cell of claim 1, wherein the packing material is tubules having an inner diameter of 100 to 200 micrometers.

10. The fuel cell of claim 1, wherein the packing material is formed of a metal selected from the group consisting of Ti, Cr, Te, Co, Ni, Cu, Al, Mo, Rh, Pd, Ag, W, Pt and Au or an alloy containing one or more of them, or is formed of a ceramic comprising one or more selected from the group consisting of Mg, Al, Si and Zr.

11. The fuel cell of claim 1, wherein a plurality of fuel cell elements, which are formed into a multi-element stack by stacking a plurality of single fuel cell elements having a solid electrolyte layer sandwiched between a cathode layer and an anode layer in such a manner that the anode layer of one fuel cell element and the cathode layer of another fuel cell element, which are adjacent to each other, are directly joined to each other, is used.

12. The fuel cell of claim 1, wherein at least the cathode and anode layers of the stack of fuel cell elements are porous, and wherein the stack of fuel cell elements is contained in the container so that the layers of the stack of fuel cell elements are parallel to the direction of flow of the mixed fuel gas.

13. The fuel cell of claim 1, wherein the cathode, anode and electrolyte layers of the stack of fuel cell elements are porous, and wherein the stack of fuel cell elements is contained in the container so that the layers of the stack of fuel cell elements are perpendicular to the direction of flow of the mixed fuel gas traveling from one space to another.

14. The fuel cell of claim 12, wherein the porous layers have an open porosity equal to or greater than 20%.

15. The fuel cell of claim 12, wherein the porous layers have an open porosity of 30 to 70%.

16. The fuel cell of claim 13, wherein the porous layers have an open porosity equal to or greater than 20%.

17. The fuel cell of claim 13, wherein the porous layers have an open porosity of 30 to 70%.

18. The fuel cell of claim 1, wherein the cathode layer is formed of a manganite, gallate or cobaltite compound of lanthanum to which an element of group Ill of the periodic table is added.

19. The fuel cell of claim 1, wherein the anode layer is formed of a body supporting nickel cermet or platinum to which an electrolyte forming the solid electrolyte layer is added.

20. The fuel cell of claim 1, wherein the electrolyte layer is formed of a zirconium oxide which is partially stabilized by an element of group III of the periodic table, or a cerium oxide which is doped with lanthanide.

21. A method comprising:
feeding to a container containing a fuel cell element or elements a mixed fuel gas containing a fuel gas and oxygen to generate electricity;
discharging the gas having passed through the fuel cell element or elements, as an exhaust gas, from the container, wherein the space other than the fuel cell element or elements in the container, through which the mixed fuel gas or the exhaust gas flows, is filled with packing materials to form a packed layer having a gap between the adjacent packing materials, at which gap the mixed fuel gas cannot be ignited, at the operation of the fuel cell, even if the mixed fuel gas has a fuel gas concentration within the ignition limits for the mixed fuel gas; and
burning the exhaust gas discharged from the packed layer at a burn-up section provided at or in the vicinity of the exhaust gas outlet of the container.

* * * * *

UNITED STATES PATENT AND TRADEMARK OFFICE
CERTIFICATE OF CORRECTION

PATENT NO. : 7,078,120 B2
APPLICATION NO. : 10/401738
DATED : July 18, 2006
INVENTOR(S) : Michio Horiuchi et al.

It is certified that error appears in the above-identified patent and that said Letters Patent is hereby corrected as shown below:

Column 11, Line 15, change "I11" to --III--.

Signed and Sealed this

Twenty-sixth Day of December, 2006

JON W. DUDAS
*Director of the United States Patent and Trademark Office*